US012197844B2

United States Patent
Benedetto et al.

(10) Patent No.: US 12,197,844 B2
(45) Date of Patent: Jan. 14, 2025

(54) PROVIDING A UI INPUT GENERATION INTERFACE FOR DRAFTING TEXT DESCRIPTIONS USED BY AN AI IMAGE GENERATION MODEL

(71) Applicant: Sony Interactive Entertainment Inc., Tokyo (JP)

(72) Inventors: Warren Benedetto, Foothill Ranch, CA (US); Charlie Wayne Denison, Piedmont, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/077,158

(22) Filed: Dec. 7, 2022

(65) Prior Publication Data
US 2024/0193351 A1  Jun. 13, 2024

(51) Int. Cl.
G06F 3/0482 (2013.01)
G06F 3/0484 (2022.01)
G06F 40/166 (2020.01)
G06F 40/279 (2020.01)
G06T 11/60 (2006.01)

(52) U.S. Cl.
CPC .......... *G06F 40/166* (2020.01); *G06F 3/0482* (2013.01); *G06F 3/0484* (2013.01); *G06F 40/279* (2020.01); *G06T 11/60* (2013.01)

(58) Field of Classification Search
CPC .... G06F 40/166; G06F 40/279; G06F 3/0482; G06F 3/0484; G06T 11/60
See application file for complete search history.

(56) References Cited

U.S. PATENT DOCUMENTS

| | | | |
|---|---|---|---|
| 7,646,384 B2* | 1/2010 | Anderson | G06T 19/20 345/428 |
| 10,928,821 B2* | 2/2021 | Achtelik | G01C 11/06 |
| 2010/0073466 A1* | 3/2010 | Jones | H04N 13/10 348/51 |
| 2012/0265779 A1* | 10/2012 | Hsu | G06F 16/3322 707/E17.074 |
| 2019/0163768 A1* | 5/2019 | Gulati | G06F 16/56 |
| 2019/0294631 A1* | 9/2019 | Alcantara | G06V 20/41 |
| 2021/0264234 A1* | 8/2021 | Paris | G06N 3/048 |
| 2021/0289264 A1* | 9/2021 | Booth | G06F 16/735 |

(Continued)

OTHER PUBLICATIONS

ISR & WO PCT/US2023/082062, dated Mar. 6, 2024, total 12 pages.

(Continued)

*Primary Examiner* — Anil K Bhargava
(74) *Attorney, Agent, or Firm* — PENILLA IP, APC

(57) ABSTRACT

Methods and system for generating an image for a user prompt provided by a user includes receiving the user prompt from the user. The user prompt is analyzed to detect text input and keywords included within. Keyword variations are provided to one or more keywords for user selection. An adjusted user prompt is generated by replacing keywords in the user prompt with keyword variations selected by the user. An image customized for the adjusted user prompt is generated to include image features that are influenced by content of the adjusted user prompt. The customized image providing a visual representation of the adjusted prompt is returned to a client device for rendering.

21 Claims, 10 Drawing Sheets

(56) References Cited

U.S. PATENT DOCUMENTS

2023/0049258 A1* 2/2023 Cudworth ............. G06F 3/0237
2023/0137231 A1* 5/2023 Tang ........................ G06N 3/08
                                                    705/26.7

OTHER PUBLICATIONS

Vincent Terrasi: "How To Create Perfect Images for SEO With Dall-E 2", Search Engine Journal, Aug. 29, 2022 (Aug. 29, 2022), pp. 1-21, XP093134493, Retrieved from the Internet: URL:https://www.searchenginejournal.com/image-seo-dall-e-2/461011/ [retrieved on Feb. 23, 2024] p. 1-p.5.

* cited by examiner

PROVIDING A UI INPUT GENERATION INTERFACE FOR DRAFTING TEXT DESCRIPTIONS USED BY AN AI IMAGE GENERATION MODEL

FIELD

The present disclosure relates to systems and methods for providing images for a text prompt provided by a user.

BACKGROUND

With the growing amount of interactive content available online, users have the ability to search for and receive content that satisfies their search query. One area where the users are unable to receive customized content that matches their search query and their true intent is with images. When a user searches for images by entering keywords or phrases, the images that are returned do not contextually match with their true search intent.

In order for a user to have a satisfactory image search experience, it is necessary to understand the context of the query and the true intent of the user so as to return images that satisfy the user's true intent and contextually match the search query.

It is in this context that embodiments of the invention arise.

SUMMARY

Implementations of the present disclosure relate to systems and methods for receiving query prompts from the user and returning images that match the context of the query prompts and the intentions of the user.

Typically, the query prompts are received as text provided by the user. As the user enters text, a search tool interprets the text and uses a text-to-image conversion tool to identify the keywords in the text and returns an image that is appropriate for the keywords. In identifying the keywords and returning the image, the search tool interprets the text literally and generates the image based on such interpretation. The keywords entered by the user in the query prompt can have a context. As the user continues to enter additional text in the text prompt, the additional keywords can change the context of the keywords. However, the image returned by the search tool continues to match the literal interpretation rather than the contextual interpretation of the text (i.e., keywords) entered in the query prompt.

To return more meaningful and contextually relevant image in for a query prompt provided by the user, the various implementations are described, in which the context of the text provided in the query prompt is determined and the image with image features that are influenced by the content of the query prompt is generated and returned. The generated image is contextually relevant to the content of the query prompt. To determine the context of the query prompt, the text in the query prompt (i.e., text prompt) is analyzed to identify keywords and the sequence of keywords, when more than one keyword is provided in the query prompt. The keywords and keyword sequences define the subject matter of the query prompt. As the user adds additional keywords to the query prompt, the additional keywords are analyzed to determine if the additional keywords continue to relate to the same context associated with the initial query prompt or if the context has changed due to the presence of the additional text. To understand the intention of the user providing the query prompt, the system identifies and provides keyword variations to one or more of the keywords included in the query prompt for user selection. If the user selects a particular keyword variation for a keyword provided at the user interface, the selected keyword variation is used in place of the keyword to generate an adjusted prompt. Due to the inclusion of a keyword variation in place of the keyword, the context of the adjusted prompt can vary from that of the original user prompt. The adjusted prompt is then used by the system to identify image features that are influenced by the keywords and generate an image using the identified image features. The generated image provides a contextually relevant visual representation of the query prompt. It should be noted that throughout this application, the query prompt is used interchangeably with the text prompt or user prompt to refer to the text entered by the user for generating an image.

In one implementation, a method for generating an image for a user prompt is disclosed. The method includes receiving a user prompt from a user. The user prompt received from the user can be in the form of text provided at a user interface at a client device of the user. The user prompt is analyzed to identify keywords included in the text. Keyword variations are provided to one or more keywords included in the text, at the user interface for user selection. User selection of a particular keyword variation to the one or more keywords identified in the user prompt, is received and is used to replace the one or more keywords to generate an adjusted prompt. An image is generated that is customized for the adjusted user prompt of the user, wherein the generated image includes image features that are influenced by content provided by the keywords in the adjusted prompt. The generated image providing a visual representation of the adjusted prompt is returned to the client device for rendering, in response to the user prompt.

In an alternate implementation, a method for generating an image using an image generation artificial intelligence (IGAI) process is disclosed. The method includes receiving a first user prompt from a user at a user interface of a client device. The first user prompt is received in a form of a source image. The source image is analyzed to identify image features contained within and to generate a first text prompt defining the image features. The first text prompt represents metadata of the source image. A second user prompt is received from the user in a form of a second text prompt at the user interface. The first text prompt and the second text prompt are aggregated to generate an aggregated user prompt. The aggregated user prompt is analyzed to identify keywords and a sequence of the keywords included therein. Keyword variations to the one or more keywords included in the aggregated user prompt are provided at the user interface for user selection. User selection of a keyword variation for the one or more keywords included in the aggregated user prompt is received and is used to replace the one or more keywords in the aggregated user prompt to generate an adjusted prompt. The source image is dynamically updated in accordance to the adjusted prompt, wherein the dynamic adjusting of the source image includes identifying an image feature representing the one or more keywords in the adjusted prompt and influencing a change in the identified image feature of the source image such that the identified image feature reflects a style specified by the keywords in the second user prompt. The updated source image represents a visual representation of the adjusted prompt and is forwarded to the client device for rendering, in response to receiving the first and the second user prompts from the user.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIGS. 4A-1 and 4A-2 illustrate an example user interface for providing options of keyword variations for keywords identified in the text prompt, in accordance with one implementation.

FIGS. 4B-1 and 4B-2 illustrate an example user interface for providing options of sequence variations for a sequence of keywords included in the text prompt, in accordance with one implementation.

DETAILED DESCRIPTION

Figure 1:
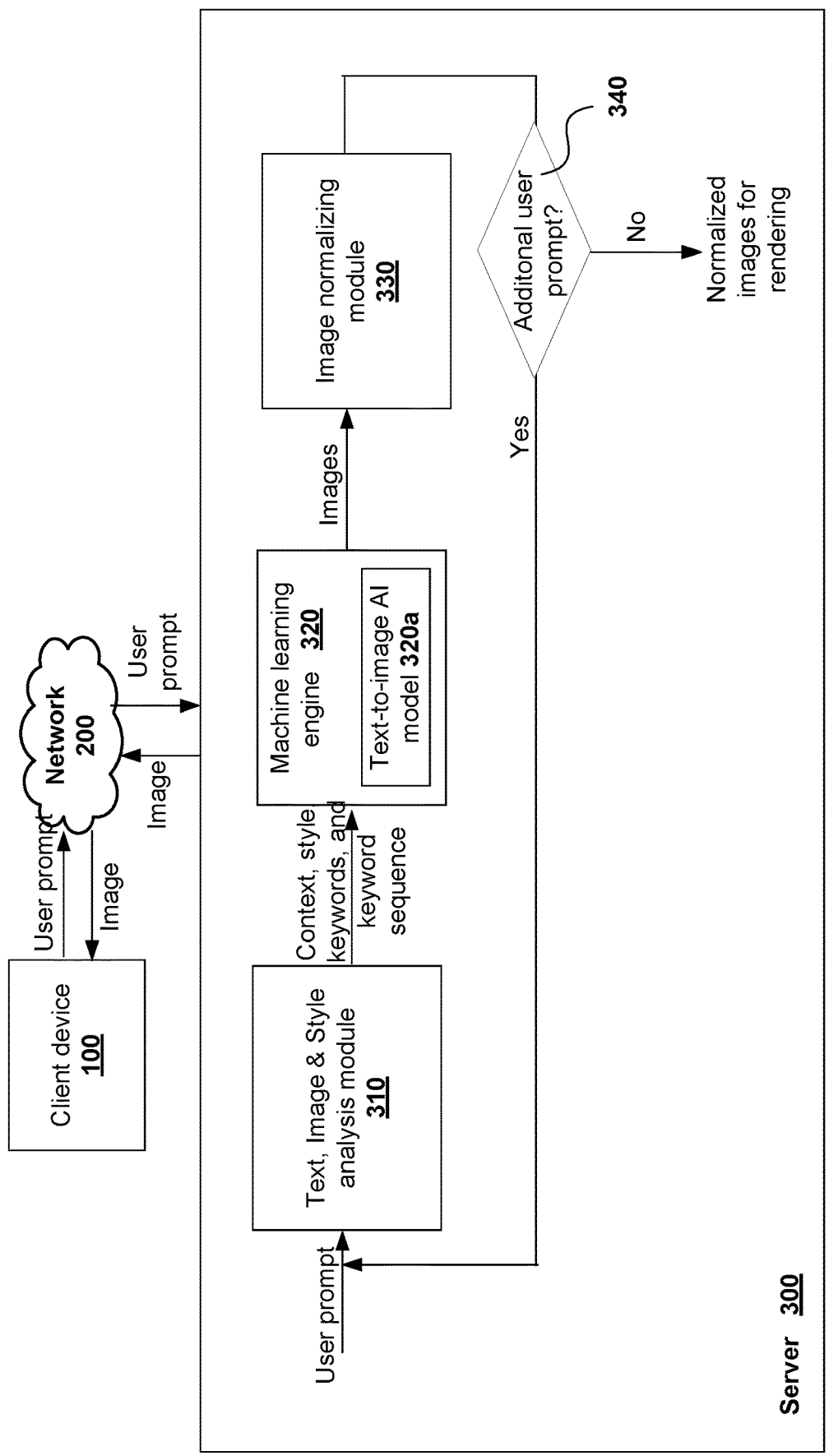
FIG. 1 represents a simplified block diagram of a system used to analyze user prompt from a user and to generate an image that includes image features that are influenced by content of the user prompt and a style specified by the user, in accordance with one implementation.

Systems and method for generating an image using an image generation artificial intelligence (IGAI) process are described. It should be noted that various implementations of the present disclosure are practiced without some or all of the specific details. In other instances, well known process operations have not been described in detail in order not to unnecessarily obscure various embodiments of the present disclosure.

The various implementations described herein allow the system to receive user prompts from a user and return an image having image features that match the content of a user prompt of the user. An image generation artificial intelligence (IGAI) process is used to receive the user prompt, analyze the user prompt to determine if the user prompt includes an image or keywords or both, determine the context of the user prompt, and identify image features that match the context and, where available, a style preferred by the user, and generate a single image with the identified image features that provides a visual representation of the user prompt. Where the user prompt includes text, the user prompt is examined to identify keywords included within. The keywords are analyzed to determine the context of the user prompt. As part of analysis, the IGAI process provides keyword variations (i.e., alternate keywords) for the one or more keywords entered by the user in the user prompt. The keyword variations are provided to better understand the user's intentions for the user prompt. For example, if the user begins to enter "dark sky," in a search field provided on a user interface of a client device, the IGAI process can identify the keyword "dark" in the user prompt and the context as it relates to the "dark sky", and provide keyword variations for "dark" that relate to the context. In this example, the keyword variations may include "cloudy", "rainy", "night", "ominous" as it relates to the context pertaining to "dark sky". As the user continues to enter additional text, such as "dark sky over a field" (wherein the italicized words "over the field" being newly added by the user to the user prompt), the system dynamically re-defines the context of the user prompt by considering the additional keywords entered by the user and refines the keyword variations provided for the keyword "dark" to remove the keyword variation, "ominous" from the list and instead only include, "cloudy", "rainy", "night". Similarly, the system can identify the keyword "field" in the user prompt and provide keyword variations for the keyword "field" in accordance to the context of the user prompt so as to include "landscape", "football field", "farm", etc.

As noted, the keyword variations are provided to better understand the intentions of the user's choice of keywords expressed in the user prompt so that an appropriate image can be generated to provide a true, visual representation of the user prompt. The contextual analysis and provisioning of keyword variations for the one or more keywords included in the user prompt are done in substantial real-time as the user enters the text. The user can choose to select or not select anyone of the keyword variations. When the user selects a keyword variation from the keyword variations provided for the one or more keywords, the selected keyword variation is used in place the respective one or more keywords in the user prompt to generate the image. The keyword variations are provided to enhance a quality of the user prompt so that image generated for the user prompt is relevant and is a visual representation of the user prompt.

In addition to identifying keyword variations to one or more keywords, the analysis module can also identify sequence of keywords used in the user prompt and provide sequence variations based on the context of the keywords included in the user prompt. As with the keyword variation, user selection of the sequence variation is used to adjust the user prompt. The keywords, sequence of keywords and context of the adjusted user prompt are fed into an Image Artificial Intelligence (AI) model that is part of the IGAI process. The AI model is trained using multiple text and image datasets collected over time to identify different image features that match the context of the user prompt and the concept of user's true intentions represented in the keywords. The Image AI model uses the identified image features that correspond to the context of the keywords (individual keywords, combination of keywords (i.e., sequence of keywords)), and intelligently generates an image that includes the identified image features and is a single, visual representation of the user prompt. The generated image is returned to a client device of the user for user consumption.

Typical text-to-image tools used the keywords in the user prompt literally to identify image features and use the identified image features to generate a single image. However, the image that is generated from such tools are not a true interpretation and contextual representation of the user prompt as the tools used the keywords literally without understanding the relationship between the keywords in the user prompt. For example, if the user prompt is, "make a movie poster in the style of red dawn," the conventional tools may interpret the user prompt literally to mean color red for keyword "red", sunrise for keyword "dawn", etc. The tools used did not have the ability to understand the concept of the user's true intentions represented in the keywords included in the user prompt and the relationship between the keywords (i.e., context) to recognize that the user may have been alluding to a movie title, a game title, a song title, etc. Thus, by literally interpreting the keywords of the user prompt, the tools fed the individual keywords to an AI model, which detected the individual keywords and generated an image with image features that were more relevant to individual keywords in the user prompt rather than the context. For instance, from the above example of the user prompt, the tools fed the individual keywords "red", "dawn" to the AI model, which used the individual keywords to identify image features that represented a red poster and a view of a sunrise. Thus, the image generated using these image features is styled to show a red poster with an image of a sunrise, while the user's true intention may be alluding to movie poster that is styled similar to a movie by name "Red Dawn".

The analysis tool used in the various implementations described herein overcomes the issues pertaining to literal interpretation of the keywords, by not only identifying and considering the keywords in the user prompt but also the sequence of keywords and the context determined from choice of keywords and keyword sequences of the user prompt. The analysis tool recognizes the concept alluded to by the user based on the user's choice of keywords and uses the concept, the context of the user prompt to identify image features for including in an image generated for the user prompt.

With the general understanding of the disclosure, specific implementations of identifying and using appropriate image features that are contextually relevant to the user prompt to generate an image that is a visual representation of the user prompt will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates an example system used for receiving and processing a user prompt provided by a user to identify keywords, and to generate an image with image features that are influence by content of the user prompt, in one implementation. The system includes a client device 100 that is communicatively linked with a server 300 via a network 200, such as the Internet. The client device 100 is associated with the user and includes a display screen for rendering a user interface that is used to provide user prompts. The user prompt provided by the user can be in the form of text (i.e., words/keywords) or a source image or both. The client device 100, in some implementations, includes an encoder to encode the user prompt and forward the user prompt over the network 200 to the server 300 for processing. The client device 100 can be a thin-client computer, a laptop computer, a desktop computer, a mobile computing device, a head mounted display or any other wearable computing device, or any other computing device that is used by the user and is capable of communicatively connecting to the server 300 over the network 200 to transmit the user prompt and to generate an image for the user prompt. The user prompt is encoded at a coder/decoder (CODEC) module available at the client device 100 and the encoded user prompt is transmitted to the server 300 over the network 200 in accordance to communication protocol followed for communicating between the client device 100 and the server 300.

The server 300 can be an independent server (i.e., a stand-alone server, such as a console) or a virtual machine or is part of a cloud system, wherein the cloud system includes a plurality of servers 300 distributed across different geo locations. The server 300 is configured to host a plurality of content or is communicatively connected to different hosts to retrieve appropriately relevant content hosted at the respective hosts. The server 300 is configured to receive the encoded user prompt, decode the encoded user prompt to extract the user prompt, and process the user prompt received from the client device 100 of the user. The server 300 includes a server-side CODEC (not shown) to receive the encoded user prompt and extract the user prompt by decoding the encoded user prompt. To assist in processing the user prompt, the server 300 includes a plurality of modules (i.e., components or engines). Some of the modules used for processing the user prompt include a text, image and style analysis module (simply referred to henceforth as "analysis module") 310, a machine learning (ML) engine 320, which includes a text-to-image AI model (or simply referred to henceforth as "AI model") 320a, and an image normalizing module 330.

Each of the components or engines on the server 300 used to process the user prompt can be a hardware component or a software component. To illustrate, each of the analysis module 310, the ML engine 320 (with the AI model 320a) and the image normalizing module 330 is a software program or a portion of a software program that is executed by a separate processor (e.g., AI processor (not shown)) or by the processor of the server 300. The AI model 320a can be a machine learning model or a neural network or an AI model. In alternate implementations, each of the analysis module 310, the ML engine 320 and the image normalizing module 330 is a hardware circuit portion of an application specific integrated circuit (ASIC) or a programmable logic device (PLD).

In addition to the aforementioned modules used for processing user prompt, the server can include additional modules for performing other functions, such as executing interactive applications, processing user inputs and updating appropriate interactive applications, generating content for the interactive applications, packaging the generated content and encoding the content for transmission back to the client device 100 for rendering or for user consumption. The server also includes memory to store the user prompt, and the one or more modules, when the one or more modules are software modules, used for processing the user prompt. The stored modules are retrieved from memory and executed by a processor, in response to detecting a user prompt at the server 300.

The analysis module 310 is used to process the user prompt. The user prompt can include text string and/or an image input provided by the user. As part of processing, the analysis module examines the user prompt to determine if the user prompt contains text string or image input or both. When the user prompt includes text string, the analysis module 310 examines the text string to identify keywords and keyword sequence contained in the user prompt and determines a context of the user prompt based on the keywords and the keyword sequence. If the user prompt includes an image (e.g., a source image), the analysis module 310 analyzes the source image to identify features contained within and generates text content to describe the features. The text content generated for the source image includes sufficient details that can be used to re-create the source image. If the user provides the image in addition to text string in the user prompt, the text content generated for the source image is combined with the text string provided in the user prompt to generate an aggregate prompt. The analysis module 310 then analyzes the aggregate prompt to identify keywords and sequence of keywords to determine the context of the user prompt. The context with the keywords and the keyword sequence are forwarded to the ML engine 320 for identifying image features to include in an image generated for the user prompt.

In addition to the user prompt, the analysis module 310 queries and receives a style preferred by the user and forwards the style to the ML engine 320 to assist the ML engine 320 to identify the image features that are influence by content included in the user prompt. The style defines the type of content preferred by the user. In some implementations, the style can be expressly defined by the user at the user interface rendered on a display screen of the client device 100. In alternate implementations, the style can be deduced from the user profile data of the user or from interactive content consumed by the user over time. The user profile data can be retrieved from a user profile database (not shown) using a user identifier of the user. The interactive content preferred by the user can be retrieved from usage history or interactive history maintained for the user in content database (not shown), for example.

The ML engine 320 performs an IGAI process which engages a text-to-image AI model (or simply referred to henceforth as "AI model") 320a to use the content (i.e., keywords, keyword sequence, and context determined from the user prompt, as well as the style preferred by the user) of the user prompt to identify relevant image features (i.e., outputs). The image features are identified to exhibit a style that is influenced by the content of the user prompt. In some implementations, the AI model 320a engaged by the ML engine 320 is a proprietary AI model that is executing on the server 300 or executing on another server (not shown) and accessed using an application programming interface (API) (not shown). In the case of accessing the AI model 320a through the API, the ML engine 320 can include the API or can rely on the API on the server 300 to access the AI model 320a. Irrespective of the AI model 320a used by the ML engine 320, the AI model 320a is generated and trained continually using a trained dataset of text prompts and vast amount of images made available by content providers and/or users to define the inter-relationship between the various text prompts and the images. The inter-relationship, in some implementations, can be established based on a level of match of the outputs (i.e., image features) to the different aspects of a text prompt, such as (i.e., level of match of image features to the one or more keywords and/or sequence of keywords used in the text prompt, and/or the context of the text prompt), style preference of the user, etc. Each of the image features identified for the user prompt is identified based on the image feature matching at least to a certain level to at least one aspect of the user prompt (e.g., keywords, sequence of keywords, context, style). The image features (i.e., outputs) identified by the AI model 320a are then used by the ML engine 320 to generate an image that is contextually relevant and a true, visual representation of the user prompt, wherein each image feature included in the generated image is influenced by the content of the user prompt and is identified to match a style preference of the user.

In some implementations, the generated image is examined to ensure that the generated image is devoid of any visual anomalies before the generated image is forwarded to the display screen of the client device 100 for rendering. To ensure the integrity of the generated image, the generated image is forwarded as input to an image normalizing module 330. The image normalizing module 330 is configured to examine each of the image features included in the generated image to ensure that each image feature included in the generated image does not have any visual anomalies. If any visual anomaly is detected in an image feature, the image normalizing module 330 identifies and applies an appropriate filter to correct the visual anomaly in the image feature so that the generated image after the filter has been applied is devoid of any anomalies. For example, if the generated image includes a man having 3 arms or if any body part seems out of place or oriented abnormally, appropriate filter is applied to adjust the particular image feature of the generated image so as to correct the visual anomaly. In the above example of the image of a man having 3 arms, the filter may be applied to obscure the 3rd arm which is out of place. The normalized generated image that is a visual representation of the user prompt is returned for rendering to the display screen of the client device 100.

After generating the generated image for the user prompt, the system determines if there is additional input (e.g., additional keywords or additional source image) was added to the user prompt, as shown at decision point 340. It should be noted that the analysis module 310, the AI model 320 and the image normalizing module 330 can process the user prompt on-the-fly as the user is providing the input for the user prompt. Consequently, the initial user prompt is used to generate an image with image features matching the content of the user prompt. As additional prompts are provided by the user, the additional prompts are analyzed using the analysis module 310 to identify the additional keywords and additional keyword sequences from the additional keywords. The context of the user prompt is refined by taking into consideration the additional keywords. The additional keywords, additional keyword sequences and the refined context are used to dynamically adjust the image generated for the user prompt. The dynamic adjustment to the generated image continues so long as additional input is being provided by the user at the user prompt. Once the user has completed their input to the user prompt, the resulting normalized image is forwarded to the client device 100 for rendering. The normalized image returned to the client device 100 provides a visual representation of the user prompt and is in accordance to the style preferred by the user. Further, the image features included in the generated image captures the intentions expressed by the user in the user prompt as the IGAI takes into consideration the concept of the user prompt as expressed in the choice of the keywords, keyword sequences and the relationship between the keywords.

Figure 2:
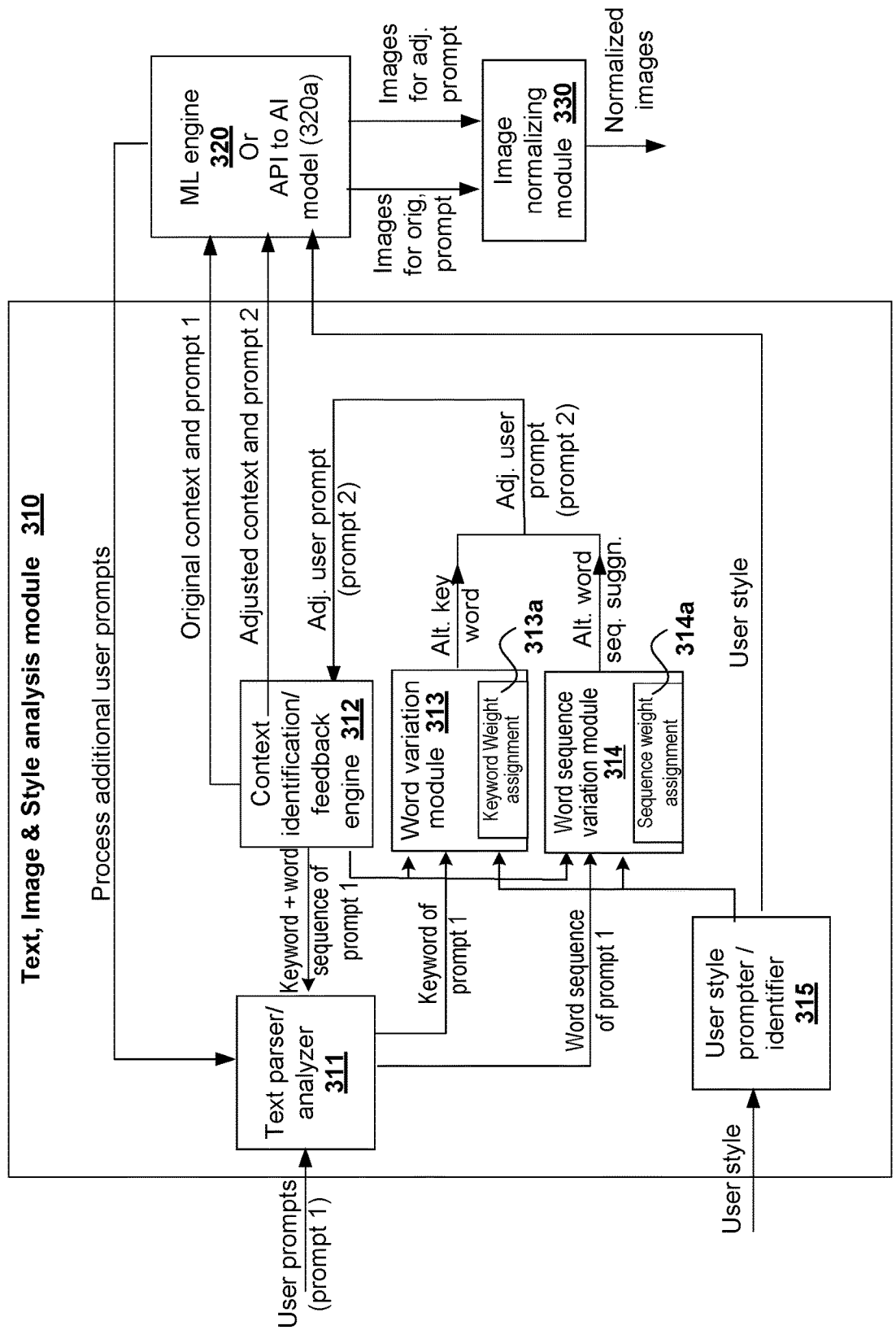
FIG. 2 illustrates a simplified block diagram of various components of a text and style analysis module used to analyze the text included in the user prompt and to provide adjustments to the user prompt for use in contextually generating an image representation of the user prompt, in accordance with one implementation.
Figure 3:
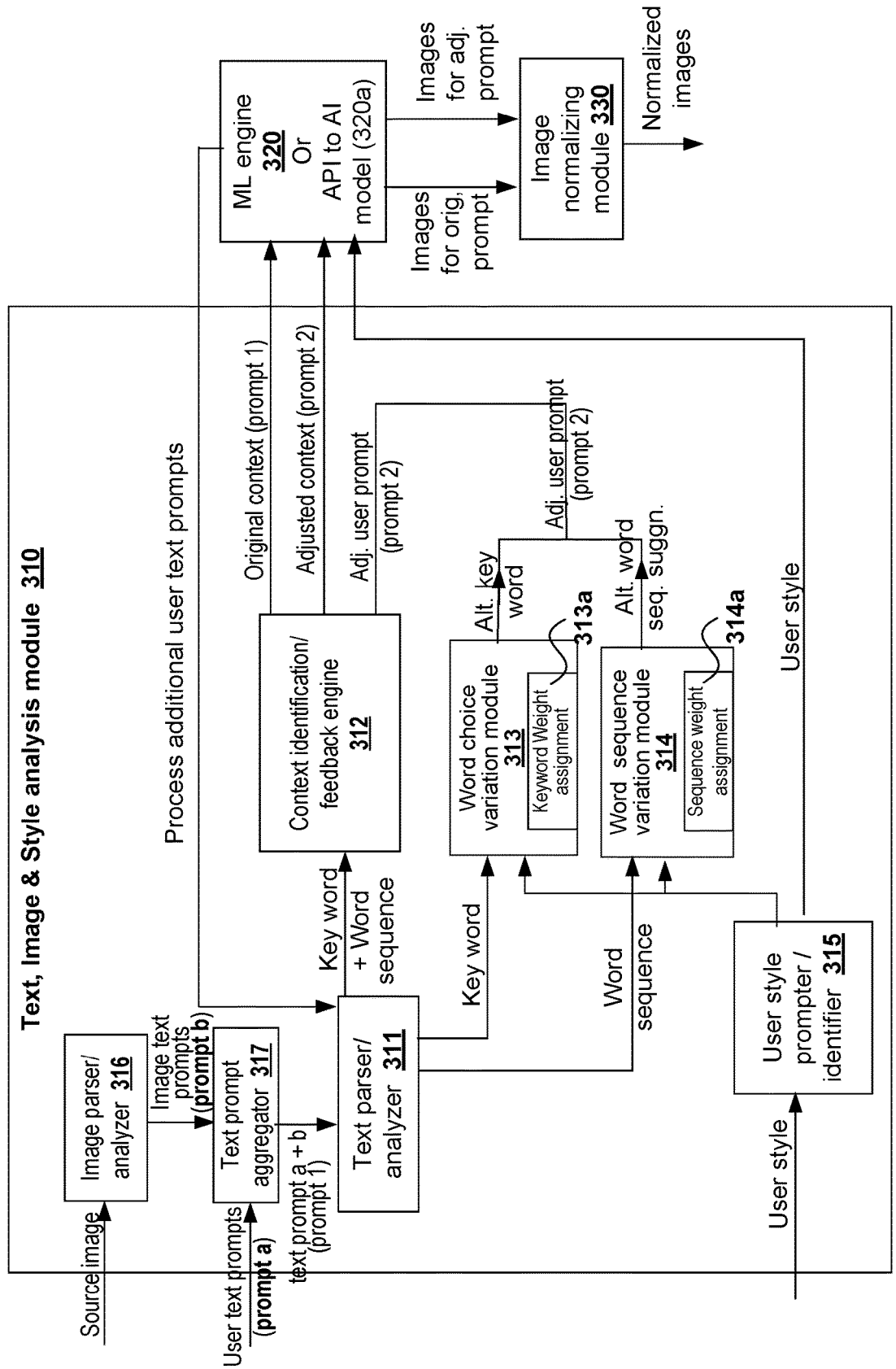
FIG. 3 illustrates an alternate implementation of various components of a text and style analysis module used to receive an image prompt and a text prompt from a user, analyze the image prompt and the text prompt to provide adjustments to the text prompt, and use the adjusted text prompt to identify image features that are used to update an image included in the image prompt in order to provide a contextually relevant visual representation of the image prompt and the text prompt, in accordance with one implementation.

As noted before, the user prompt provided by the user can include text strings and/or one or more source images. The text strings can include one or more keywords and the one or more source images provided in the user prompt can be user-generated images or obtained from a content provider or content distributor. Alternately, the user can provide a uniform resource locator (URL) link from where the user selected image(s) can be retrieved. FIG. 2 illustrates an implementation of an analysis module 310 used for processing text input provided in the user prompt, and FIG. 3 illustrates an alternate implementation of the analysis module 310 used for processing both text input and image input provided in the user prompt.

Referring now to FIG. 2, the analysis module 310 includes a plurality of components used to analyze text input included in the user prompt and to identify the various aspects of the text input in order to understand the intentions of the user providing the user prompt. The intentions of the user can be best understood by identifying the keywords included in the user prompt, and analyzing the user's choice of keywords and sequence of keywords, so that the one or more image features representing the keywords, sequence of keywords can be identified and used in generating the image for the user prompt. The analysis module 310 includes a plurality of components that can be used to analyze the text input and identify the various aspects and concept of the user's query prompt. In some implementations, the analysis module 310 includes a text parser/analyzer (or simply referred to henceforth as "text analyzer") 311, a context identification/feedback engine (or simply referred to henceforth as "context identification engine") 312, a word choice suggestion module 313, a word sequence variation module 314, and a user style prompter/identifier (or simply referred to henceforth as "user style identifier") 315.

The text analyzer 311 is configured to parse the user prompt received from the client device 100 to identify text strings included therein. The user prompt received at the server 300 is in encoded and compressed form in accordance to encoding and transmission protocol established between the client device 100 and the server 300. Consequently, when the user prompt is received at the server 300, the server 300 uses a server-side CODEC (not shown) to decode/decompress the encoded user prompt and to extract the user prompt. The extracted user prompt is then forwarded to the analysis module 310 as "prompt 1" for analysis. The text analyzer 311 parses the text input included in prompt 1 to identify one or more keywords and, when more than one keyword is used, the sequence of keywords included in prompt 1. The identified keywords and the sequence of keywords of prompt 1 are forwarded to a context identification engine 312.

The context identification engine 312 uses the original choice of keywords and keyword sequence(s) to determine the original context of the user prompt. The original context and prompt 1 including the original keyword(s) and keyword sequence are forwarded to the ML engine 320 as input.

In addition to receiving the original context and prompt 1, the ML engine 320 also receives a style preferred by the user. A user style prompter/identifier (also simply referred to henceforth as "style identifier") 315 is used to obtain the style preferred by the user. The style identifier 315 can send a query identifying a plurality of style options to the client device for presenting at the user interface for user selection. The style options, in some implementations, can be in any one of the following forms—checkboxes, selectable lists, radio buttons, etc. In alternate implementations, the query can be initiated using a text field. User selection of a particular style from the plurality of selectable options or user specification received at the text field is returned to the style identifier 315, in response to the query. In alternate implementations, the style identifier 315 can query a user profile of the user to obtain the style preferred by the user. In yet other implementations, the style identifier 315 can analyze the usage history of the user to identify the type of content consumed by the user and correlate the type of content to the style preference of the user. The style of the user obtained by the style identifier 315 is provided as input to the ML engine 320.

The intentions of the user deduced from the choice of keywords and keyword sequence provided in the user prompt may or may not represent the true intentions of the user. To ensure that the analysis module 310 has fully grasped the true intentions of the user as expressed in the user prompt, the analysis module 310 performs an input verification process. As part of input verification, the analysis module 310 generates appropriate signals to the text analyzer 311 to forward the one or more keywords and the keyword sequence identified from the user prompt to appropriate suggestion modules. The suggestion modules are used to analyze the keywords/keyword sequence in the context of the user prompt, determine any variations to the one or more keywords and keyword sequence expressed in the user prompt and whether the user intended to provide such variations in the user prompt. When the suggestion modules identify such variations to the keyword(s) and/or the keyword sequence, such variations are returned to the client device 100 for rendering at the user interface for user selection. Based on the user selection of the keyword variation, the context of the user prompt can be dynamically determined and the user's intentions correctly gauged.

For instance, a first signal is directed toward the text analyzer 311 directing the text analyzer 311 to forward the one or more keywords identified in the user prompt (i.e., prompt 1) to a word variation module 313. A second signal is directed toward the context identification engine 312 to provide the context of the original prompt 1 to the word variation module 313. In response to receiving the one or more keywords of prompt 1 from the text analyzer 311 and the context of prompt 1 from the context identification engine 312, the word variation module 313 suggests keyword variations to the one or more keywords based on the determined context. In some implementations, the keyword variations to the one or more keywords of prompt 1 are identified to correspond with a style of the user, wherein the style of the user is obtained by querying the style identifier 315.

Figures 1, 4A:
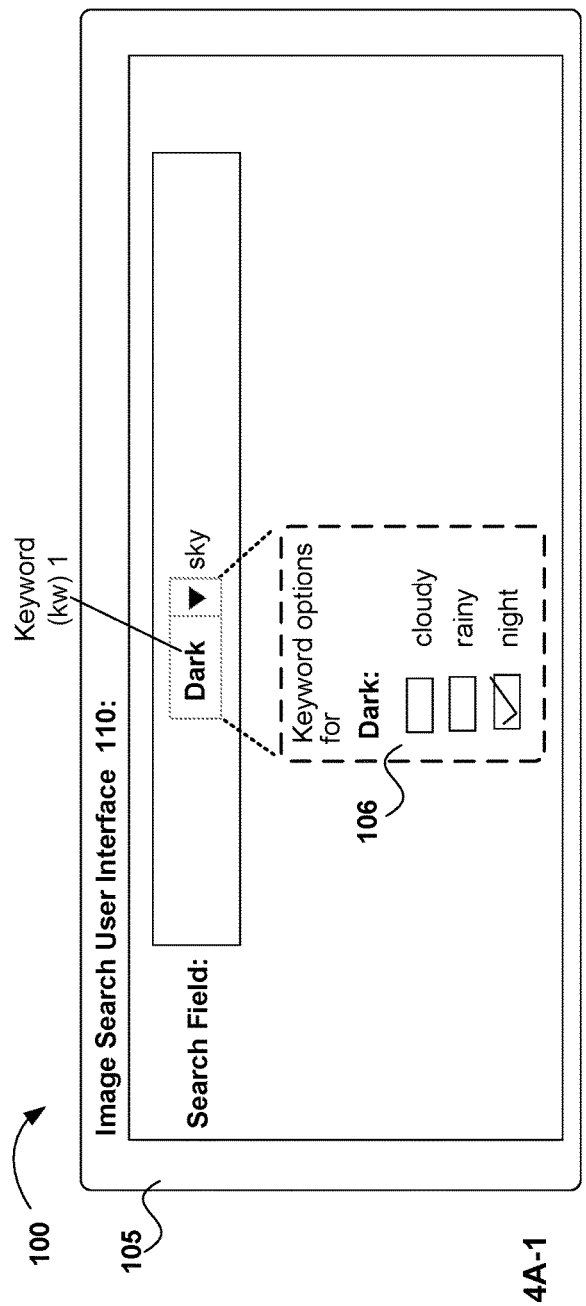
Figures 2, 4A:
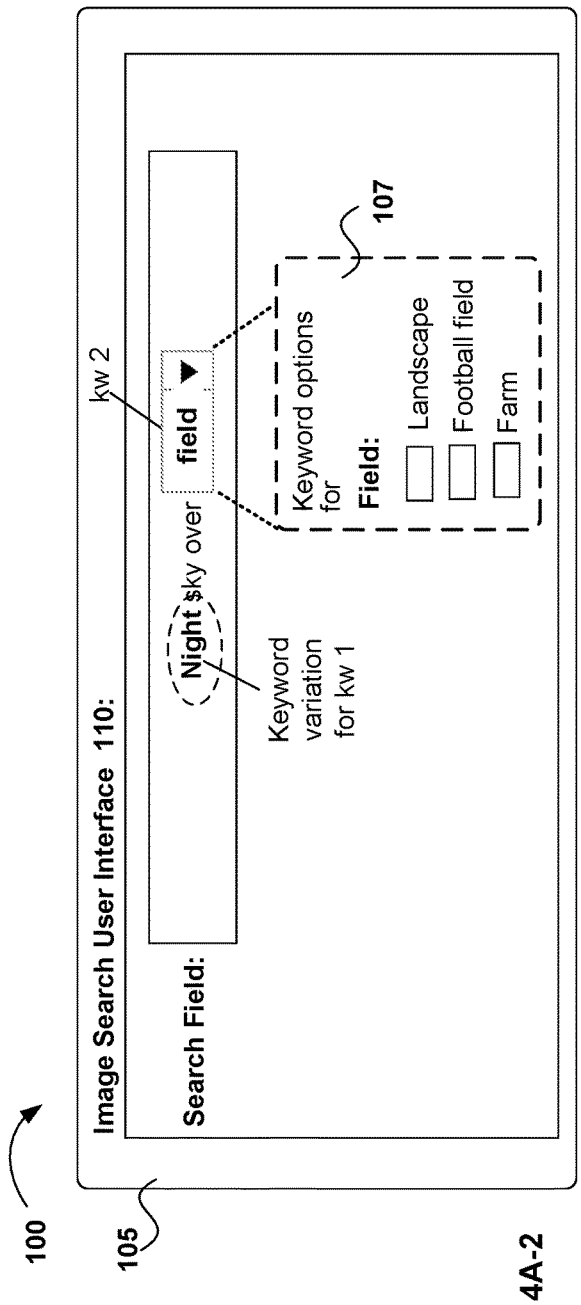

FIGS. 4A-1 and 4A-2 illustrate some examples of keyword variations identified and presented for the one or more keywords identified in prompt 1. In the example illustrated in FIG. 4A-1, the user begins to enter text input in the search field rendered in the user interface 110 at a display screen 105 of the client device 100. In the example illustrated in FIG. 4A-1, the user has provided an initial text prompt, "Dark sky". The initial text prompt defines the prompt 1 provided by the user. In response to detecting the text input of prompt 1 entered by the user, the text analyzer 311 dynamically parses the text input and identifies the keyword kw 1, "dark" included in prompt 1. The text analyzer 311 forwards the identified keyword kw 1 to the word variation module 313. In response to receiving the keyword kw 1, the word variation module 313 dynamically queries and receives the current context of the text input from the context identification engine 312, and, where available, the style preference of the user from the style identifier 315. The word variation module 313 then identifies the keyword variations for keyword kw 1 (i.e., keyword "dark") in accordance to the current context of prompt 1 and the style of the user. The identified keyword variations for keyword kw 1 are returned to the client device for rendering in the user interface 110 for user selection. An example set of keyword variations identified for the keyword "dark" is shown as checkboxes in box 106 of FIG. 4A-1. The keyword variations for the keyword "dark" returned by the word variation module 313 includes, "cloudy", "rainy", and "night". Instead of the check boxes, the selectable options for the keyword kw 1 can be provided as a drop-down list or radio buttons, for example. User selection of a keyword variation is used to replace the identified keyword kw 1 in prompt 1 to generate an adjusted prompt, prompt 2. FIG. 4A-2 shows an example of the adjusted prompt, prompt 2, that includes the keyword variation 'night' replacing the keyword 'dark' in prompt 1. As and when prompt 2 is adjusted (i.e., updated), the adjusted prompt is fed to the context identification engine 312 to determine the updated context of the adjusted prompt, prompt 2. The adjusted prompt, prompt 2 is forwarded to the client device for rendering in the search field at the user interface, where the user provides the text input.

When the user provides additional text in the search field, the text analyzer 311 detects the additional text and dynamically parses the additional text to identify a second keyword kw 2, "field" in prompt 2. The second keyword kw 2 is forwarded to the word variation module 313, which uses the updated context of the adjusted prompt (updated with the keyword variation for kw 1) to identify keyword variations for the second keyword kw 2. FIG. 4A-2 illustrates an example set of keyword variations identified for the second keyword kw 2 and rendered in box 107 by the word variation module 313. As with the keyword variations for the keyword kw 1, the keyword variations for the second keyword kw 2 is identified in accordance to the updated context of prompt 2 and the style of the user. User selection of the keyword variation for the second keyword kw 2 is used to update the adjusted prompt and the updated, adjusted prompt is forwarded to the context identification engine 312 to determine the updated context of prompt 2. The process of receiving additional keywords in the search field, identifying and providing keyword variations for each identified keyword, and updating prompt 2 continues so long as the user provides additional text input in the search field.

The adjusted context and the updated prompt 2 is also fed into the ML engine 320 as input so that appropriate image features influencing the content of prompt 2 can be identified for generating the image for the user prompt.

Referring back to FIG. 2, in some implementations, the word variation module 313 uses the relative weight assigned to each keyword in the user prompt to identify which ones of the keywords to provide keyword variations and which keyword to ignore. The relative weight represents relevance of the keyword in the user prompt. For example, in the example illustrated in FIGS. 4A-1 and 4A-2, keywords 'dark' and 'sky' are identified in the user prompt and each is assigned a relative weight based on the context. In this example, the keyword 'dark' is more contextually relevant and is therefore assigned a higher relative weight than the keyword 'sky' which is assigned a lower relative weight. Based on the relative weights of the keywords of prompt 1, keyword 'dark' is selected and keyword variations are provided for user selection while keyword sky is ignored (i.e., no keyword variations identified/provided). A keyword weight assignment module 313a is engaged to assign relative weights to the keywords identified in prompt 1 based on the current context of prompt 1. User selection of a particular keyword variation for the keyword 'dark' is used to update prompt 1 to generate prompt 2. The context of prompt 2 can change due to change in the keywords included within. Consequently, prompt 2 is provided as input to the context identification engine 312 to determine the context of prompt 2. The keyword weight assignment module 313a takes into consideration the relevance of each keyword of the user prompt to the overall context when assigning the weight to each keyword so that the resulting prompt 1 properly captures the user's intentions.

Continuing to refer to FIG. 2, when more than one keyword is included in prompt 1, prompt 1 is parsed to identify sequence of keywords (i.e., keyword sequence) contained within. In response to detecting keyword sequence in prompt 1, a second signal is directed by the analysis module 310 to the text analyzer 311 to forward the keyword sequences to a word sequence variation module 314. In response to receiving the keyword sequences of user prompt (e.g., prompt 1 or prompt 2, when prompt 1 was adjusted using keyword variation of one or more keywords), the word sequence variation module 314 queries and receives the context of prompt 1 (or prompt 2) from the context identification engine 312 and uses the context of prompt 1 (or prompt 2) and a style preference of the user received from a style identifier 315 to suggest sequence variations for the keyword sequence identified in prompt 1 (or prompt 2). The style, in some implementations, specifies the type of content the user prefers. For example, the user can specify that they prefer content that are happy/cheery, dark/serious, etc. Similar to assigning weights for the different keywords, the word sequence variation module 314 can engage a sequence weight assignment module 314a to assign weights to the different keyword sequences, when more than one keyword sequence is identified in prompt 1, and use the relative weights of the keyword sequences to identify a particular keyword sequence and to identify the corresponding sequence variations for the particular keyword sequence. The identified sequence variations are forwarded to the client device for rendering at the user interface 110 for user selection.

Figures 1, 4B:
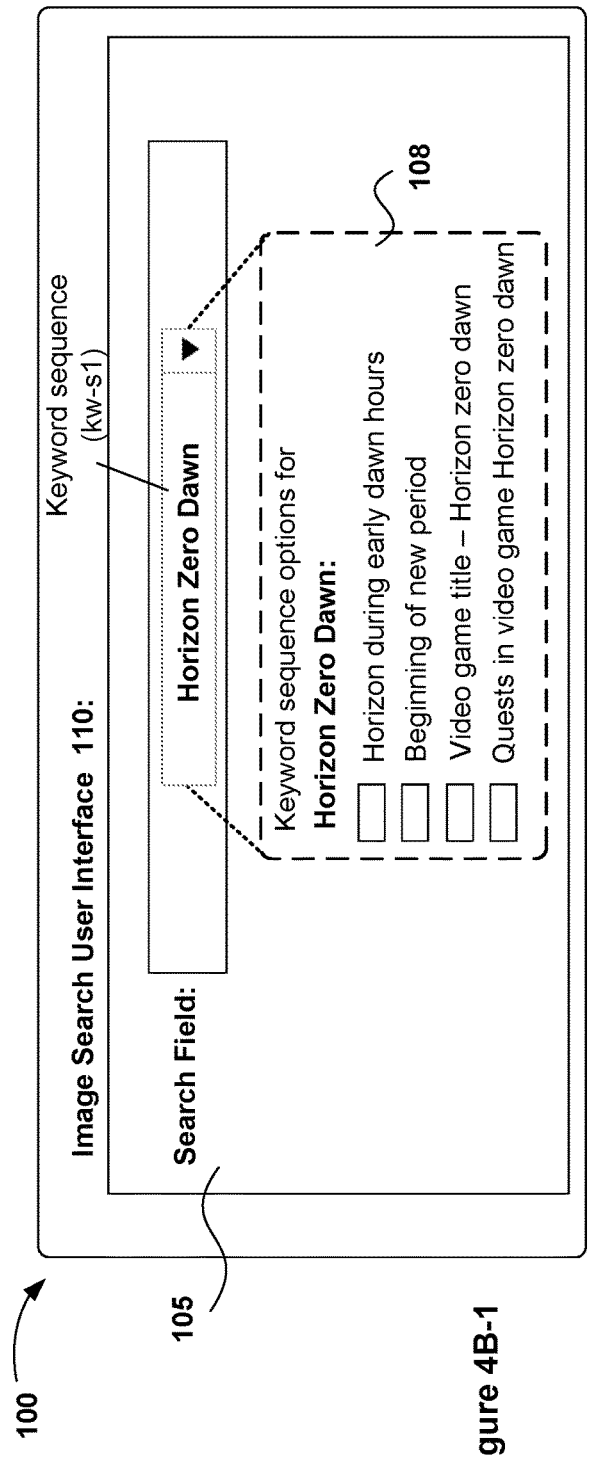
Figures 2, 4B:
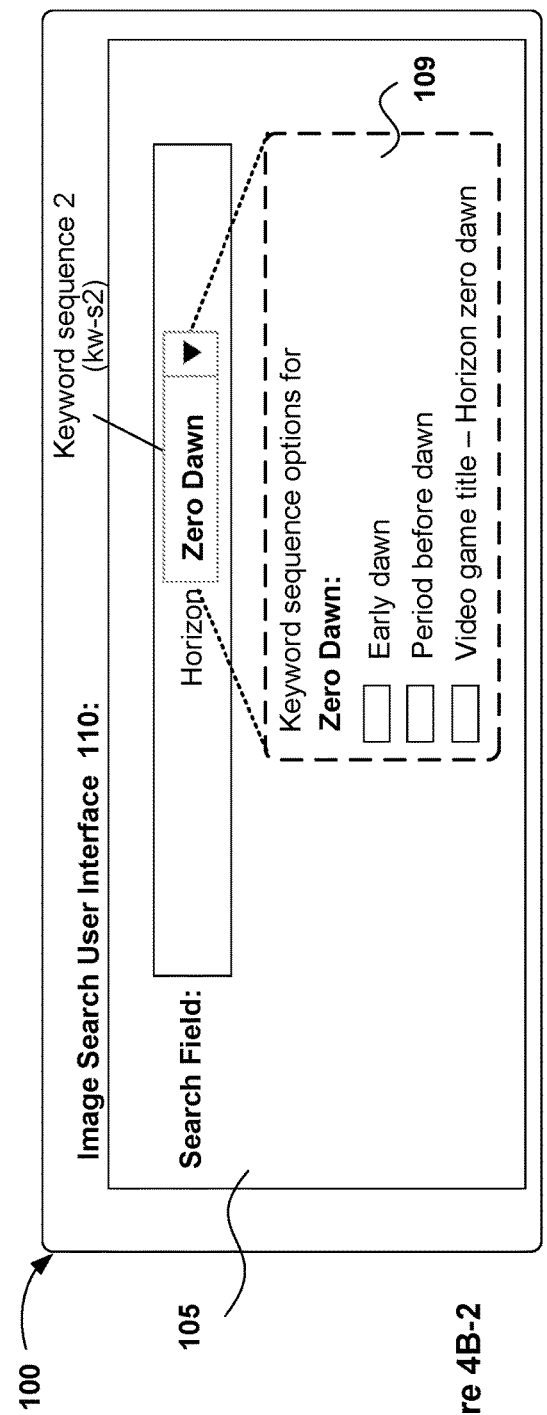

FIGS. 4B-1 and 4B-2 illustrate examples of the different sequence variations identified in prompt 1 and the corresponding sequence variations. For example, the user may enter the text input—"Horizon Zero Dawn" at the search field in the user interface 110, wherein the text input represents prompt 1 (i.e., user prompt) of the user. Prompt 1 is forwarded to the text analyzer 311 of the analysis module 310 executing at the server 300. In response to receiving the user input, the text analyzer 311 parses the user input to detect the text input and the keyword sequences contained within. From the above example of prompt 1 entered by the user, the text analyzer 311 can identify "Horizon zero Dawn" as keyword sequence 1 (kw-s1), and "zero dawn" as keyword sequence 2 (kw-s2). The identified keyword sequences are forwarded to the word sequence variation module 314, which engages the sequence weight assignment module 314a to assign relative weights to the keywords included in each keyword sequence identified for prompt 1 and generate a corresponding overall weight for each keyword sequence.

The overall weight assigned for each keyword sequence, in some implementations, is used to prioritize the different keyword sequences. Based on the relative weights of the keyword sequences identified in prompt 1, a particular keyword sequence is identified first and sequence variations for the particular keyword sequence is provided at the user prompt for user selection.

FIG. 4B-1 shows an example of the keyword sequence kw-s1 identified in prompt 1 that has been selected based on the overall weight, and the sequence variations for the identified keyword sequence kw-s1 is presented in box 108 at the user interface 110 for user selection. The keyword variations are identified for the keyword sequence kw-s1 (i.e., for keyword sequence—"horizon zero dawn") of prompt 1 by taking into consideration the concept of the choice of keywords and the relationship of the keywords included in the keyword sequence kw-s1, the current context of prompt 1 (or prompt 2) and the style preference of the user, when identifying and presenting the sequence variations at the display screen 105 of the client device 100 for user selection. Alternately, sequence variations for keyword sequence kw-s2 are identified and presented for user selection. FIG. 4B-2 illustrates the sequence variations (box 109) identified for keyword sequence kw-s2 (i.e., for keyword sequence "zero dawn") of prompt 1. The user may or may not select the sequence variations provided at the user interface. When the user does select a sequence variation, the user selection of the sequence variation is used in replace of the identified keyword sequence in prompt 1 (or prompt 2) to generate or update the adjusted keyword prompt—prompt 2.

Referring back to FIG. 2, in some implementations, the sequence variations will take into consideration any keyword variations that were selected by the user for the one or more keywords of prompt 1. This is to ensure that any context changes occurring due to the inclusion of the keyword variations are considered when identifying keyword sequence and the corresponding sequence variations. Thus, in some implementations, the keyword sequence(s) of the original user prompt (i.e., prompt 1) and the keyword sequence(s) of the adjusted user prompt (i.e., prompt 2), where available, are used to provide sequence variations so that all keywords and combination of keywords are considered when determining the context of the user prompt. As with the identification of keyword variations, a current context of prompt 1, prompt 2 are taken into consideration when identifying the sequence variations for the keyword sequence identified in each of the prompts (prompt 1, prompt 2). The current context and the prompts 1 and 2 are provided as inputs to the ML engine 320.

The ML engine 320 forwards the context and the prompts (prompt 1, prompt 2) provided by the context identification engine 312 as inputs to the AI model 320*a* along with the user's style. The AI model 320*a* uses the inputs and identifies relevant outputs in the form of image features that are influenced by the content of the respective prompts. As noted, the AI model is trained using trained dataset, which includes user prompts and images received from a plurality of users and content providers, wherein the images can include user-generated images and images provided by content providers. The prompts and the context provided to the ML engine 320 include the original prompt (i.e., prompt 1 without variations to keyword or keyword sequence) and the corresponding original context, and the adjusted prompt (i.e., prompt 2 that includes variations to keywords and/or keyword sequence) and the corresponding adjusted context. In response to receiving the prompts and the corresponding contexts, the AI model 320*a* identifies a first set of outputs (i.e., first set of image features) in accordance to the style of the user and the original context of prompt 1, and a second set of outputs (i.e., second set of image features) in accordance with the style of the user and the adjusted context of prompt 2. Each image feature identified is influenced by some portion of content of the respective prompts (i.e., prompt 1 or prompt 2). The AI model 320*a* then intelligently combines the image features identified for each prompt to generate separate images to represent the respective prompts. For example, the AI model 320*a* uses the first set of image features to generate a first image that provides a visual representation and is contextually relevant to the keywords and sequence of keywords of prompt 1. Similarly, the AI model 320*a* uses the second set of image features to generate a second image that provides a visual representation and is contextually relevant to the keywords and sequence of keywords of prompt 2. It should be noted that the first image is different from the second image in that the second image includes variations that are in line with the adjusted prompt.

The first image and the second image generated by the AI model 320*a* are forwarded to the client device for rendering. The first image shows the result of processing the original prompt while the second image shows the result of processing the variations in the keywords and/or keyword sequence included in the adjusted prompt. The user can view the first image and the second image simultaneously or sequentially to identify the differences in the two images.

In some implementations, the image from the adjusted prompt is used to establish a theme for the user prompt. For example, the image generated for the adjusted prompt can represent a virtual character and the theme established for the user prompt can be related to a video game. The established theme can be used to generate other virtual characters for the video game, for example. For instance, the image generated for the user prompt is examined to identify the various features and to generate a textual description of the features, wherein the textual description includes sufficient details to re-create the image. By tweaking the one or more features of the generated image (by adjusting one or more textual descriptions of the one or more features), additional virtual characters can be defined to correspond with the established theme. The virtual character and the additional virtual characters are customized for the user, based on the user prompt, and when these virtual characters are used in the video game, can provide a personalized video game due to the inclusion of the user-generated virtual characters.

FIG. 3 illustrates an alternate implementation of the analysis module 310 described with reference to FIG. 2. In this alternate implementation, the analysis module 310 is configured to receive a source image as a user prompt. The source image may be provided in the search field provided at a user interface 110 rendered at the display screen 105 of the client device 100 of the user. In some implementations, the source image is uploaded to the search field, wherein the uploaded source image is a user-generated image or an image retrieved from a content provider, such as an artist, for example. Alternately, the user can provide a uniform resource locator (URL) link to a website (e.g., an artist's website or a content provider's website) in the user prompt provided in the search field. The URL link provides the IGAI with access to retrieve the source image. In some implementations, only the source image is provided as the user prompt in the search field. In alternate implementations, the source image is provided in an image input field and the text input at a text input field at the user interface, wherein the source image and the text input represent the user prompt. The source image by itself or with the text input are compressed and encoded by a client-side encoder, in accordance to the compression and transmission protocol established between the client device 100 and the server, and transmitted to the server 300 over the network 200.

The server receives the transmitted packets, decompresses and decodes the packets to extract the source image and the text input (if any) contained within. The source image is then forwarded to an image parser/analyzer (or simply referred to henceforth as "image analyzer") 316. The image analyzer 316 parses the source image to identify the various image features included in the source image and generates text description of the identified features. The text description includes sufficient detail that can be used to re-create the source image. The text description defines the metadata of the source image. The text description defining the metadata is forwarded to a text prompt aggregator 317 as "prompt b".

If the search field at the client device receives only the source image, then the text description of the source image (prompt b) is forwarded by the text prompt aggregator 317 to the text analyzer 311 for further processing. If, however, the search field receives the source image along with the text input, the text input is provided to the text prompt aggregator as "prompt a". The text prompt aggregator 317 aggregates the text input of (prompt a) and the text description (prompt b) defining the metadata of the source image to define prompt 1. The aggregated prompt 1 is then forwarded to the text analyzer 311 for processing. Aside from the image analyzer 316 and the text prompt aggregator 317, the various components included in the analysis module 310 illustrated in FIG. 3 are similar to the components of the analysis module 310 of FIG. 2 and function in a similar manner as described with reference to FIG. 2. Consequently, the components of FIG. 3 that are common with that of FIG. 2 are identified using the same reference numbers. The various components of FIG. 3 process prompt 1 in a manner similar to what was described with reference to FIG. 2.

For instance, prompt 1, which includes the text description describing the source image and the text input provided at the search field, is processed by the text analyzer 311 similar to what was described with reference to FIG. 2. Keyword and keyword sequence are identified from prompt 1 and forwarded to the context feedback engine 312 to determine the original context of prompt 1. Keywords identified in prompt 1 are forwarded to a word variation module 313 and the keyword sequences identified in prompt 1 are forwarded to a word sequence variation module 314. Word variation module 313 identifies and provides keyword variations for the one or more keyword(s) of prompt 1, and the word sequence variation module 314 identifies and provides sequence variations for one or more keyword sequences included in prompt 1. The keyword variations and sequence variations are identified in accordance to the context of prompt 1 and the style of the user. Selection of keyword variations and/or sequence variation are used to update prompt 1 to generate adjusted user prompt (i.e., prompt 2). Prompt 2 is then fed into the context feedback engine 312 to determine the adjusted context of prompt 2. Prompt 1, the original context of prompt 1, prompt 2, the adjusted context of prompt 2 and the user style are all fed into ML engine 320 as inputs. The ML engine 320 feeds the inputs to an AI model 320a, which identifies outputs in the form of image features (first set, second set) that correspond with content of the respective user prompt (prompt 1, prompt 2), in accordance to the style of the user and the corresponding context (original context, adjusted context) of the respective user prompts (prompt 1, prompt 2). The first and the second set of image features are separately used by the AI model 320a to generate a first image and a second image to provide a visual representation of prompt 1 and prompt 2, respectively. The first and second images are returned to the client device for rendering.

The process of receiving the text input and processing the text input continues so long as the user continues to provide input. In some implementations, an upper limit may be established for the text input provided by the use at the search field. In one example, the upper limit may be defined to be 10 or 20 or 50 words. If the user input exceeds the established upper limit, then the analysis module 310 will ignore the text input that exceeds the upper limit.

Prior to forwarding the first and the second images to the client device 100 for rendering, the first and the second images are examined by an image normalizing module 330 for any anomalies. If any anomaly exists in the first image and/or the second image, such anomalies are corrected by applying a suitable filter to generate a normalized first image and/or second image, respectively. The normalized first and second images are forwarded to the client device for rendering. The images returned to the client device 100, in response to the user prompt include image features that are influenced by content of the respective user prompt, represent contextually relevant, visual representation of the user prompt.

Figure 5A:
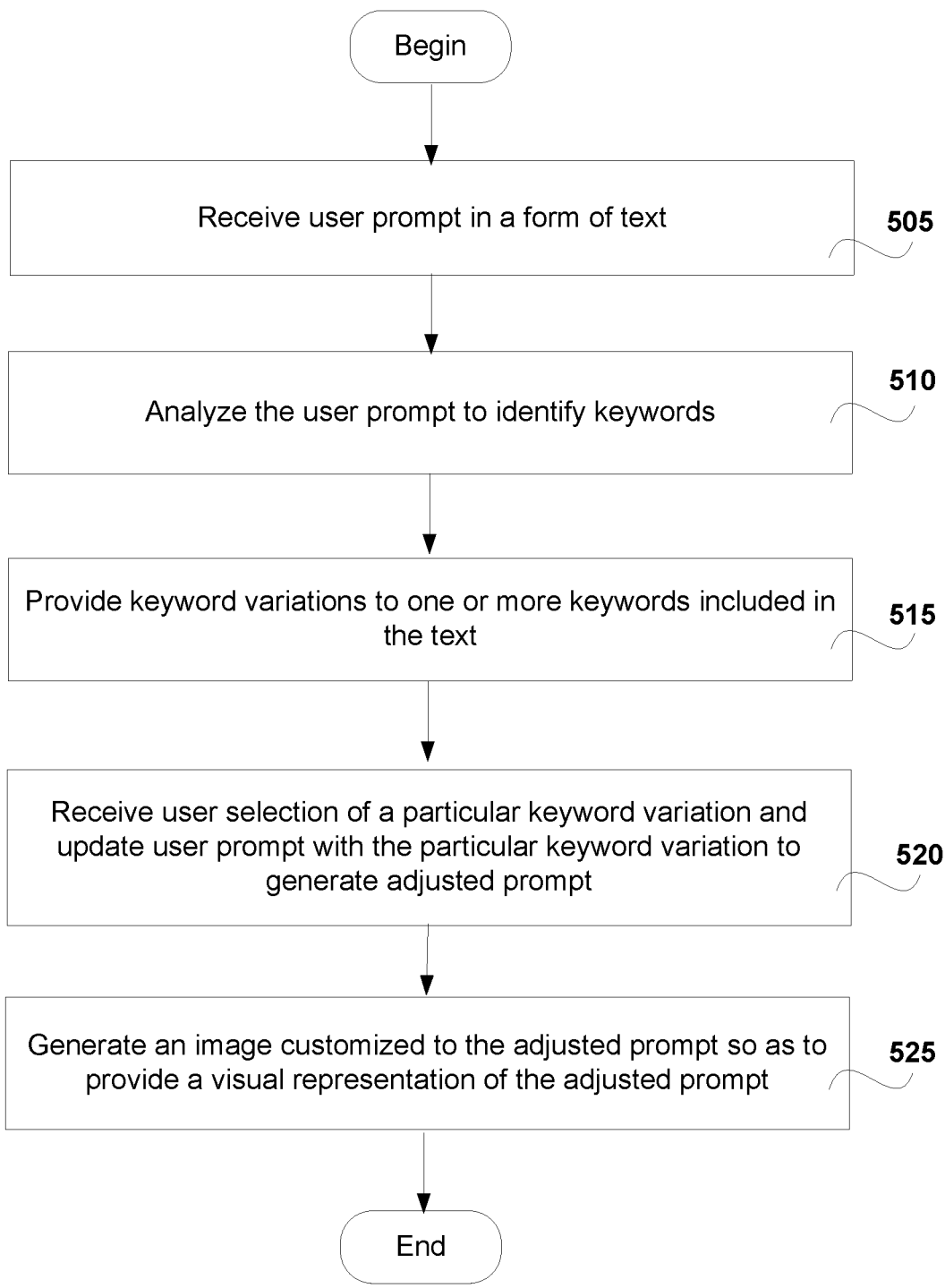
FIG. 5A illustrates flow of operations of a method for generating an image for a user prompt, in accordance with one implementation.

FIG. 5A illustrates flow of operations of a method used to generate an image using an image generation artificial intelligence (IGAI) process, in accordance with one implementation. The method begins at operation 505 when a user prompt is received from a client device. The user prompt could be in the form of text input. The text input is analyzed to identify keywords contained within, as illustrated in operation 510. The keywords are identified and the context of the user prompt is determined based on the choice of keywords included in the user prompt. One or more keywords included in the user prompt are identified and keyword variations for the one or more keywords are identified and provided for user selection, as illustrated in operation 515. The keyword variations are identified based on a style of the user and the context of the user prompt. User selection of a particular keyword variation is received and the user prompt is updated to generate an adjusted prompt, as illustrated in operation 520. The adjusted prompt is generated by replacing the one or more keywords included in the user prompt with the selected keyword variation. A context of the adjusted prompt with the selected keyword variation is determined. The context can vary based on the choice of keywords included in the keyword variation selected by the user. The adjusted context and the adjusted prompt along with the style of the user are provided as inputs to an AI model. The AI model uses the inputs to identify outputs that are contextually relevant to the adjusted prompt (i.e., adjusted user prompt that includes the keyword variation). The outputs identified by the AI model for the adjusted prompt include image features, wherein each image feature is influenced by content of the adjusted prompt (i.e., corresponds to one or more keywords included in the adjusted prompt) and provides a visual representation of the corresponding one or more keywords. The image features identified by the AI model are used to generate a customized image for the user prompt, as illustrated in operation 525. The customized image provides a single, visual representation of the adjusted prompt.

Figure 5B:
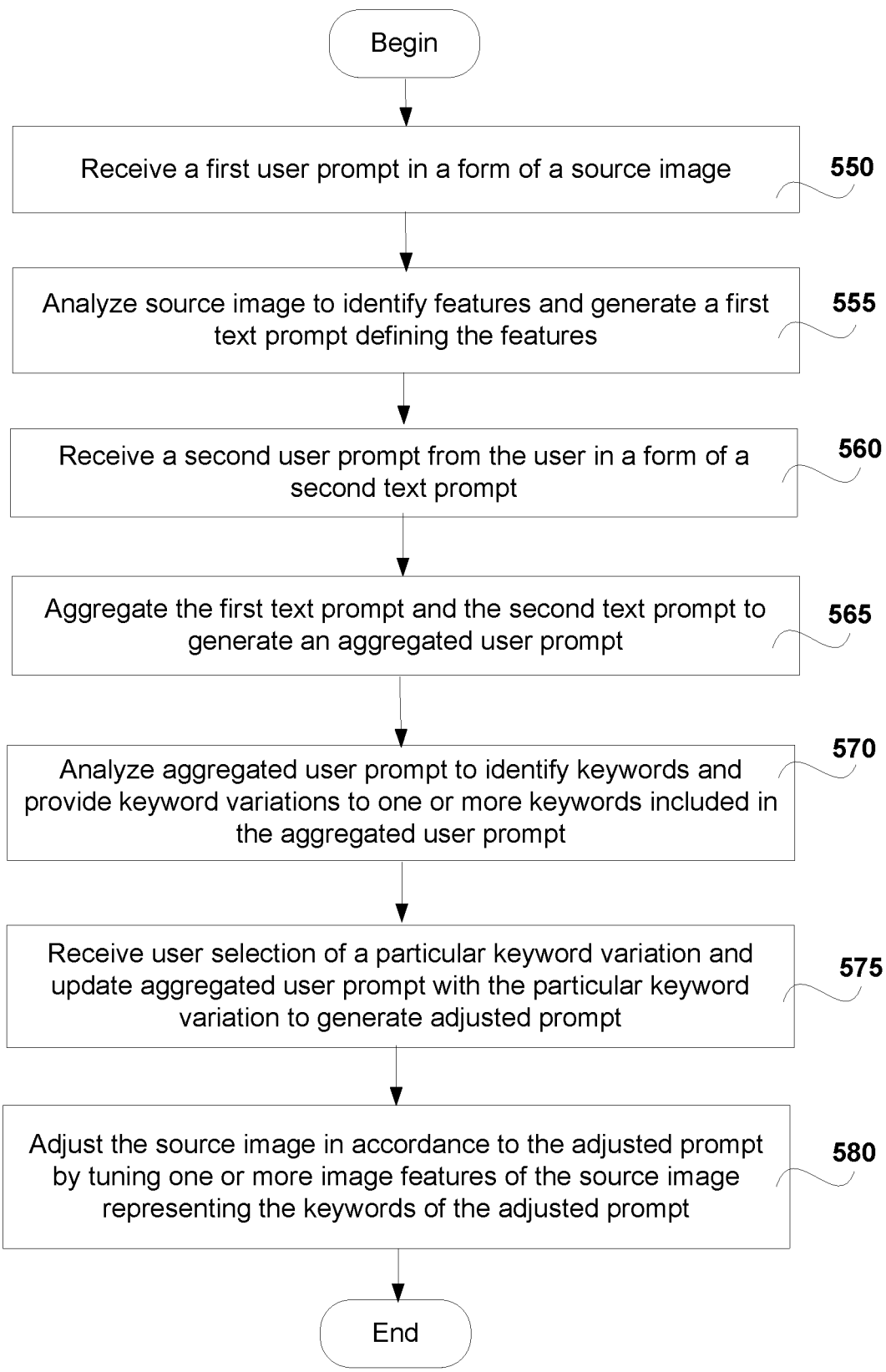
FIG. 5B illustrates flow of operations of a method for generating an image for a user prompt, in accordance with an alternate implementation.

FIG. 5B illustrates flow of operations of a method used to generate an image using an image generation artificial intelligence (IGAI) process, in accordance with an alternate implementation. The method begins at operation 550, when a first user prompt in the form of a source image is received from the client device 100. The source image may be uploaded to the search field by the user and may be user-generated image or an image retrieved from a content provider. Alternately, the first user prompt may be in the form of a URL link to access a source image on a website. The URL link can be used by the analysis module 310 to access and retrieve the source image from the website. The source image is analyzed to identify image features included within and to generate a first text prompt defining the image features, as illustrated in operation 555. The first text prompt includes sufficient details that can be used to re-create the source image and represents the metadata of the source image.

A second user prompt is received from the client device, as illustrated in operation 560. The second user prompt is in the form of a second text prompt. The second text prompt is aggregated with the first text prompt to generate an aggregated user prompt, as illustrated in operation 565. A text prompt aggregator can be used to aggregate the first text prompt and the second text prompt to generate the aggregated user prompt. The aggregated user prompt is analyzed using a text analyzer 311 to identify keywords included within and to identify any keyword variations for one or more keywords, as illustrated in operation 570. To identify keyword variations for the one or more keywords in the aggregated user prompt, a current context of the aggregated user prompt is first established. Additionally, a style of the user is determined either by requesting the style from the user at the user interface or retrieved from user profile or by analyzing content usage history of the user. The keyword variations to the one or more keywords are then identified based on the style specified or preferred by the user and the context of the aggregated user prompt. The keyword variations are forwarded to the client device for user selection.

User selection of a particular keyword variation is received at the server and, in response, the aggregated user prompt is updated to include the keyword variation in place of the one or more keywords to generate an adjusted prompt, as illustrated in operation 575. The adjusted prompt is analyzed to determine the context. The context of the adjusted prompt can be different from the context of the original user prompt (i.e., aggregated user prompt) and this may be due to the inclusion of a particular keyword variation in place of the one or more keywords. The adjusted prompt with the keyword variation is then forwarded to a ML engine, which engages an AI model to identify outputs that are influenced by the content of the adjusted prompt. In addition to the adjusted prompt, the adjusted context (i.e., context determined for the adjusted context) for the adjusted prompt and the style of the user are also provided to the AI model so that the AI model can identify outputs that are in accordance with the adjusted context of the adjusted prompt and the style of the user. The outputs identified by the AI model are image features that provide visual representation of the keywords included in the adjusted prompt. The image features identified for the adjusted prompt are used to influence a change in corresponding image features of the source image so that image feature reflects a style specified by the content of the adjusted prompt, as illustrated in operation 580. The adjusted source image is forwarded to the client device for rendering, in response to receiving the first and the second user prompts. When additional user input in the form of text prompt is received from the client device, the additional user input is processed dynamically in a similar manner and the adjusted source image is further tuned dynamically. The process of receiving additional user input and the adjustment of the source image continues so long as the user provides the user input at the search field provided in the user interface of the client device.

In some implementations, the additional user input provided by the user can include additional source images for inclusion with the initial source image. The additional source images are processed in a manner similar to the processing of the source image. The additional source images are used to update the source image in a manner similar to the way the source image is adjusted to include the style of image features identified for the keywords of the user prompt. As noted, the resulting adjusted source image provides a contextually relevant visual representation of the adjusted prompt.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, maybe be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross attention until the processed denoising is decoded back to a pixel space. In the decoding stage, upscaling is applied to achieve an image, video, or 3D asset that is of higher quality. The IGAI is therefore a custom tool that is engineered to process specific types of input and to render specific types of outputs. When the IGAI is customized, the machine learning and deep learning algorithms are tuned to achieve specific custom outputs, e.g., such as unique image assets to be used in gaming technology, specific game titles, and/or movies, customized wearable or usable products (e.g., T-shirts or other wearable clothing).

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 6A:
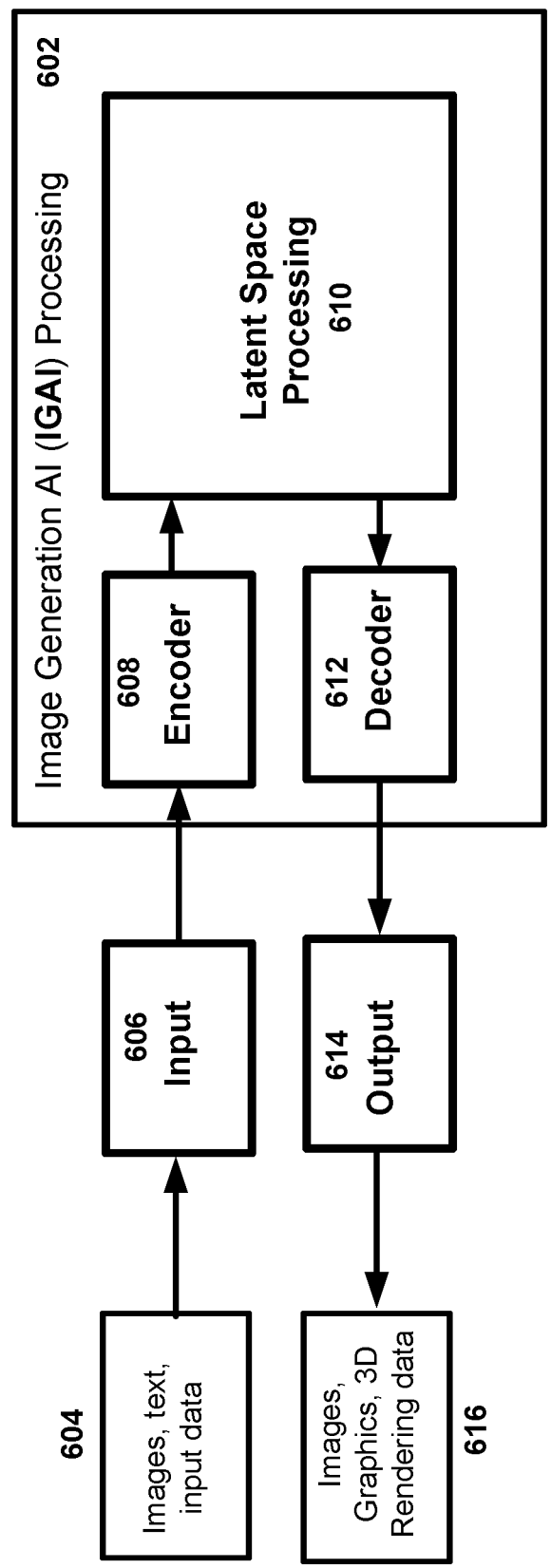
FIG. 6A illustrates an image generation AI processing sequence used to generate an image for a user prompt (i.e., query), in accordance with one implementation.

FIG. 6A is a general representation of an image generation AI (IGAI) 602 processing sequence, in accordance with one embodiment. As shown, input 606 is configured to receive input in the form of data, e.g., text description having semantic description or keywords. The text description (i.e., text input) can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 606 is configured to convey the intent of the user that wishes to utilize the IGAI to generate some digital content. In the context of game technology, the target content to be generated can be a game asset for use in a specific game scene. In such a scenario, the data set used to train the IGAI and input 606 can be used to customize the way artificial intelligence, e.g., deep neural networks, process the data to steer and tune the desired output image, data or three-dimensional digital asset.

The input 606 is then passed to the IGAI, where an encoder 608 takes input data and/or pixel space data and converts into latent space data. The concept of "latent space" is at the core of deep learning, since feature data is reduced to simplified data representations for the purpose of finding patterns and using the patterns. The latent space processing 610 is therefore executed on compressed data, which significantly reduces the processing overhead as compared to processing learning algorithms in the pixel space, which is much more data heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 610, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 612 then transforms a resulting output from the latent space back to the pixel space. The output 614 may then be processed to improve the resolution. The output 614 is then passed out as the result, which may be an image, graphics, or 3D rendering data 616 that can be rendered to a physical form or digital form.

Figure 6B:
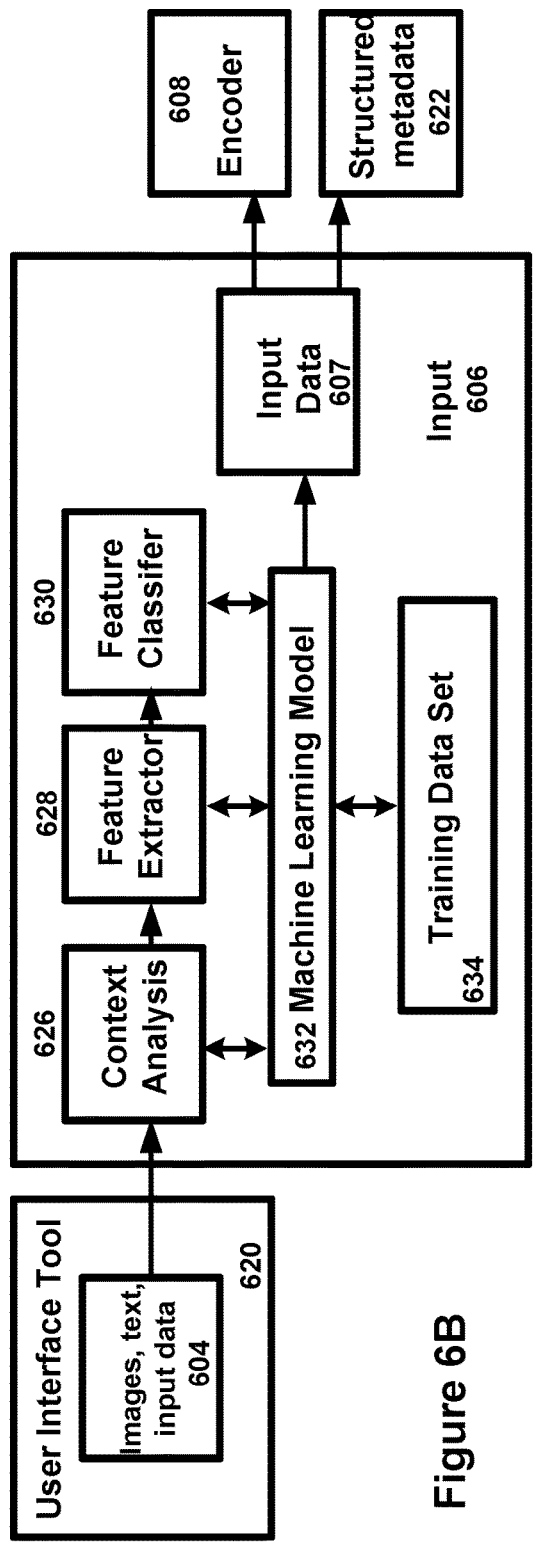
FIG. 6B illustrates additional processing that can be done to a user prompt (i.e., user input) used to generate an image, in accordance with one implementation.

FIG. 6B illustrates, in one embodiment, additional processing that may be done to the input 606. A user interface tool 620 may be used to enable a user to provide an input request 604. The input request 604, as discussed above, may be images, text, structured text, or generally data. In one embodiment, before the input request is provided to the encoder 608, the input can be processed by a machine learning process that generates a machine learning model 632, and learns from a training data set 634. By way of example, the input data maybe be processed via a context analyzer 626 to understand the context of the request. For example, if the input is "space rockets for flying to the mars", the input can be analyzed 626 to determine that the context is related to outer space and planets. The context analysis may use machine learning model 632 and training data set 634 to find related images for this context or identify specific libraries of art, images or video. If the input request also includes an image of a rocket, the feature extractor 628 can function to automatically identify feature characteristics in the rocket image, e.g., fuel tank, length, color, position, edges, lettering, flames, etc. A feature classifier 630 can also be used to classify the features and improve the machine learning model 632. In one embodiment, the input data 607 can be generated to produce structured information that can be encoded by encoder 608 into the latent space. Additionally, it is possible to extract out structured metadata 622 from the input request. The structured metadata 622 may be, for example, descriptive text used to instruct the IGAI 602 to make a modification to a characteristic or change to the input images or changes to colors, textures, or combinations thereof. For example, the input request 604 could include an image of the rocket, and the text can say "make the rocket wider" or "add more flames" or "make it stronger" or some of other modifier intended by the user (e.g., semantically provided and context analyzed). The structured metadata 622 can then be used in subsequent latent space processing to tune the output to move toward the user's intent. In one embodiment, the structured metadata may be in the form of semantic maps, text, images, or data that is engineered to represent the user's intent as to what changes or modifications should be made to an input image or content.

Figure 6C:
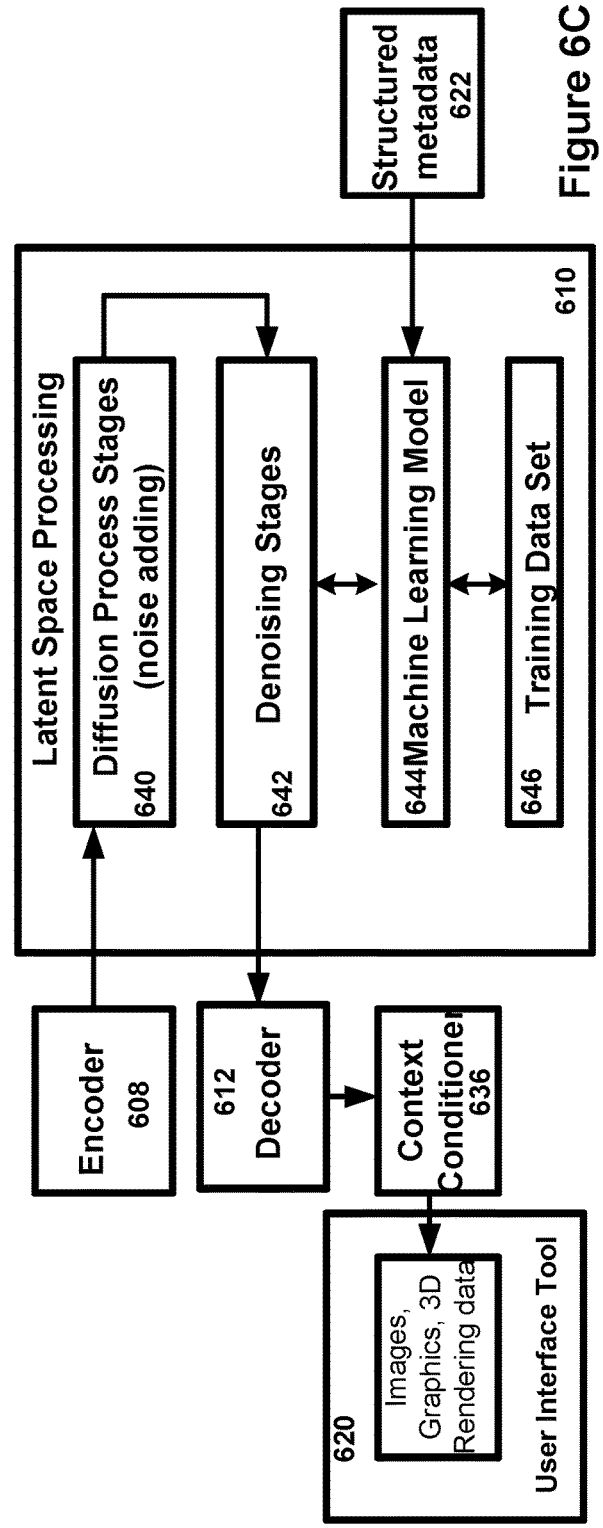
FIG. 6C illustrates processing of an output of an encoder using latent space processing, in accordance with one implementation.

FIG. 6C illustrates how the output of the encoder 608 is then fed into latent space processing 610, in accordance with one embodiment. A diffusion process is executed by diffusion process stages 640, wherein the input is processed through a number of stages to add noise to the input image or images associated with the input text. This is a progressive process, where at each stage, e.g., 10-50 or more stages, noise is added. Next, a denoising process is executed through denoising stages 642. Similar to the noise stages, a reverse process is executed where noise is removed progressively at each stage, and at each stage, machine learning is used to predict what the output image or content should be, in light of the input request intent. In one embodiment, the structured metadata 622 can be used by a machine learning model 644 at each stage of denoising, to predict how the resulting denoised image should look and how it should be modified. During these predictions, the machine learning model 644 uses the training data set 646 and the structured metadata 622, to move closer and closer to an output that most resembles the request in the input. In one embodiment, during the denoising, a U-Net architecture that has cross-attention layers may be used, to improve the predictions. After the final denoising stage, the output is provided to a decoder 612 that transforms that output to the pixel space. In one embodiment, the output is also upscaled to improve the resolution. The output of the decoder, in one embodiment, can be optionally run through a context conditioner 636 (similar to image normalizing module 330 of FIGS. 2 and 3). The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 644 gets smarter with more training over time, there will be less need for a context conditioner 636 before the output is rendered in the user interface tool 620 (e.g., display screen 105 of the client device 100 illustrated in FIGS. 4A-1 through 4B-2).

Figure 7:
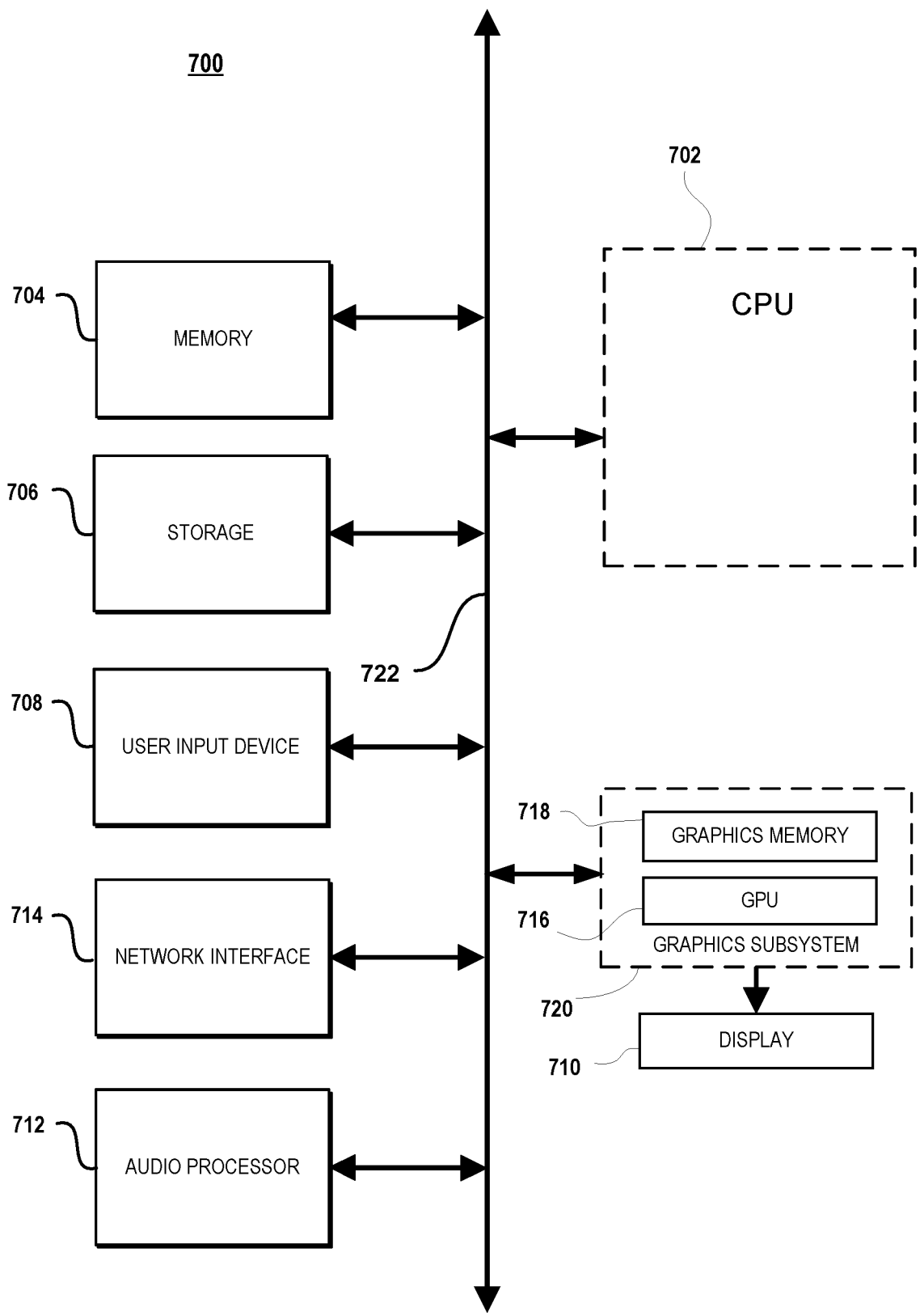
FIG. 7 illustrates components of an example server that can be used to perform aspects of the various implementations of the present disclosure.

FIG. 7 illustrates components of an example device 700 that can be used to perform aspects of the various embodiments of the present disclosure. This block diagram illustrates the device 700 that can incorporate or can be a personal computer, video game console, personal digital assistant, a server or other digital device, suitable for practicing an embodiment of the disclosure. The device 700 includes a CPU 702 for running software applications and optionally an operating system. The CPU 702 includes one or more homogeneous or heterogeneous processing cores. For example, the CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 700 can be a localized to a player playing a game segment (e.g., game console), or remote from the player (e.g., back-end server processor), or one of many servers using virtualization in a game cloud system for remote streaming of gameplay to clients.

A memory 704 stores applications and data for use by the CPU 702. A data storage 706 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 708 communicate user inputs from one or more users to the device 700. Examples of the user input devices 708 include keyboards, mouse, joysticks, touch pads, touch screens, still or video recorders/cameras, tracking devices for recognizing gestures, and/or microphones. A network interface 714 allows the device 700 to communicate with other computer systems via an electronic communications network, and may include wired or wireless communication over local area networks and wide area networks, such as the internet. An audio processor 712 is adapted to generate analog or digital audio output from instructions and/or data provided by the CPU 702, the memory 704, and/or data storage 706. The components of device 700, including the CPU 702, the memory 704, the data storage 706, the user input devices 708, the network interface 714, and an audio processor 712 are connected via a data bus 722.

A graphics subsystem 720 is further connected with the data bus 722 and the components of the device 700. The graphics subsystem 720 includes a graphics processing unit (GPU) 716 and a graphics memory 718. The graphics memory 718 includes a display memory (e.g., a frame buffer) used for storing pixel data for each pixel of an output image. The graphics memory 718 can be integrated in the same device as the GPU 716, connected as a separate device with the GPU 716, and/or implemented within the memory 704. Pixel data can be provided to the graphics memory 718 directly from the CPU 702. Alternatively, the CPU 702 provides the GPU 716 with data and/or instructions defining the desired output images, from which the GPU 716 generates the pixel data of one or more output images. The data and/or instructions defining the desired output images can be stored in the memory 704 and/or the graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from the graphics memory 718 to be displayed on the display device 710. The display device 710 can be any device capable of displaying visual information in response to a signal from the device 700, including a cathode ray tube (CRT) display, a liquid crystal display (LCD), a plasma display, and an organic light emitting diode (OLED) display. The device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for generating an image using an image generation artificial intelligence (IGAI) process, comprising:
   receiving a user prompt from a user, the user prompt received in a form of a text provided at a user interface rendered at a client device of the user;
   analyzing the user prompt to identify keywords included in the text, each keyword identified in the text assigned a relative weight based on context of the user prompt;
   providing keyword variations to select one or more keywords included in the text, at the user interface for user selection, the select one or more keywords identified based on the relative weight assigned to each keyword;
   receiving user selection of a particular keyword variation for the select one or more keywords included in the user prompt, the particular keyword variation selected by the user used to replace the select one or more keywords in the user prompt to generate an adjusted prompt, the adjusted prompt refining the context of the user prompt based on sequence of keywords that includes the keyword variation of the select one or more keywords; and
   dynamically generating the image customized for the adjusted prompt of the user, the generated image including image features that are influenced by content provided by the keywords and sequence of keywords in the adjusted prompt, wherein generating the image includes normalizing the image by removing visual anomalies included within, the normalizing performed by applying appropriate filters identified for the one or more features that include the anomalies, the generated image returned to the client device for rendering, in response to the user prompt received from the user, the image providing a single, visual representation of the adjusted prompt,
   wherein the IGAI process is executed by a processor of a server.

2. The method of claim 1, wherein providing the keyword variations further includes,
   detecting additional keywords provided to refine the user prompt; and
   dynamically refining the keyword variations identified for the select one or more keywords initially provided in the user prompt, the dynamic refining initiated in response to detecting the additional keywords and is in accordance to a context of the keywords included in the user prompt, wherein the user prompt includes the additional keywords.

3. The method of claim 1, wherein the keyword variations identified for the select one or more keywords is in accordance to a style preferred by the user, the style defining a type of content preferred by the user.

4. The method of claim 3, wherein identifying the style of the user includes,
   providing a plurality of style options identifying styles at the user interface as selectable options for user selection, the selectable options provided as radio buttons, or check boxes, or a drop down list; and
   receiving user selection of a selectable option identifying the style preference of the user.

5. The method of claim 3, wherein the style of the user is identified from text input provided by the user at a input field rendered at the user interface, or by querying a user profile of the user, or by analyzing interaction history of the user, wherein the interaction history identifies a type of content consumed by the user.

6. The method of claim 1, wherein the image features representing the keywords in the adjusted prompt are identified based on a style preference of the user, such that the image generated with the identified image features is in accordance to the style of the user.

7. The method of claim 1, wherein providing keyword variations further includes,
   analyzing the keywords included in the user prompt to determine a context; and
   presenting the keyword variations to the select one or more keywords based on the context.

8. The method of claim 1, wherein the analyzing of the user prompt is done in real-time as the user is entering the text.

9. The method of claim 1, wherein analyzing the user prompt further includes,
   providing sequence variations for the sequence of keywords identified in the adjusted prompt, at the user interface for user selection; and
   dynamically refining the adjusted prompt by replacing the sequence of keywords in the adjusted prompt with a specific sequence variation selected by the user, the adjusted prompt with the keyword variation and the specific sequence variation used in determining a context and for identifying the image features for including in the image generated for the user prompt, such that the generated image is a contextually relevant visual representation of the adjusted prompt.

10. The method of claim 1, further includes generating a second image for the user prompt of the user, the second image generated by, analyzing the keywords and a sequence of keywords included in the user prompt to determine a context of the user prompt;

identifying a second set of image features that are influenced by the keywords and the sequence of keywords of the user prompt; and generating the second image for the user prompt by using the second set of image features, the second image returned to the client device of the user for rendering, wherein the second image generated in accordance to the context of the user prompt is different from the image generated for the adjusted prompt.

11. The method of claim 10, wherein the second set of image features is identified based on a style specified by the user, such that the second image generated to include the second set of image features corresponds to the style specified by the user.

12. The method of claim 1, wherein generating the image further includes, receiving a second user prompt from the user, the second user prompt including a source image and text input identifying a certain image feature of the source image to use for adjusting the image generated for the adjusted prompt; and dynamically adjusting a particular image feature of the image generated for the adjusted prompt to include changes influenced by a style of the certain image feature of the source image, the change influenced by the text input, wherein the dynamic adjusting results in generating an adjusted image in response to the second user prompt.

13. The method of claim 1, wherein each image feature is identified for a keyword in accordance to a context associated with the adjusted prompt and a style specified by the user, such that the image generated for the adjusted prompt includes the image features and is in accordance to the style of the user, the generated image is a contextually relevant visual representation of the adjusted prompt.

14. The method of claim 1, wherein the image generated by the IGAI process represents an output of an artificial intelligence (AI) model that matches the keywords, the sequence of keywords, and context of the adjusted prompt, and is in accordance to a style specified by the user, and wherein the AI model is generated and trained using user prompts of a plurality of users.

15. The method of claim 1, wherein the normalizing includes, examining the image generated to identify an image feature that includes one or more of the visual anomalies; and identifying and applying an appropriate filter to correct the each of the one or more visual anomalies identified in the image feature of the generated image, the filter identified based on type of anomaly detected in the image feature.

16. A method for generating an image using an image generation artificial intelligence (IGAI) process, comprising:

receiving a first user prompt from a user at a user interface of a client device, the first user prompt received in a form of a source image;

analyzing the source image to identify image features contained within and to generate a first text prompt defining the image features, the first text prompt representing metadata of the source image;

receiving a second user prompt from the user, the second user prompt received in a form of a second text prompt provided at the user interface;

aggregating the first text prompt and the second text prompt to generate an aggregated user prompt;

analyzing the aggregated user prompt to identify keywords and a sequence of the keywords included therein;

providing keyword variations to one or more keywords included in the aggregated user prompt, at the user interface for user selection;

receiving user selection of a keyword variation to the one or more keywords included in the aggregated user prompt, the user selection of the keyword variation used to replace the one or more keywords included in the aggregated user prompt to generate an adjusted prompt; and dynamically updating the source image in accordance to the adjusted prompt, the dynamic adjusting includes identifying an image feature representing the one or more keywords in the adjusted prompt and influencing a change in the identified image feature of the source image such that the identified image feature reflects a style specified by the keywords of the second user prompt, the updated source image providing a visual representation of the adjusted prompt is forwarded to the client device for rendering, in response to receiving the first and the second user prompts from the user, wherein operations of the method are performed by the IGAI process executing on a processor of a server.

17. The method of claim 16, further includes, providing sequence variations to the sequence of the keywords in the adjusted prompt at the user interface for user selection, wherein the adjusted prompt includes the keyword variation selected by the user; and dynamically refining the adjusted prompt by replacing the sequence of keywords in the adjusted prompt with a specific sequence variation selected by the user, the adjusted prompt with the specific sequence variation used in identifying the image features for inclusion in the source image.

18. The method of claim 16, wherein the source image is provided as a uniform resource locator (URL) of a location on a network for retrieving the source image, or is an image uploaded by the user at the user interface.

19. The method of claim 16, wherein analyzing the aggregated user prompt includes, assigning a weight to each keyword identified in the aggregated user prompt based on an overall context of the aggregated user prompt; and using the weight of each keyword to identify select ones of the one or more keywords for providing keyword variations and for identifying the sequence variations for the sequence of keywords included in the aggregated user prompt.

20. The method of claim 16, wherein the aggregated user prompt is generated in real-time using the text from the second user prompt, and dynamically updated when additional text to the second user prompt is provided by the user.

21. The method of claim 16, wherein updating the source image includes updating the metadata of the source image to include changes to metadata corresponding to an image feature identified in the second user prompt, the updated metadata associated with the updated source image, wherein the updated metadata is used to establish a theme for the first and the second user prompts, the metadata is used to generate additional images for the established theme, wherein the additional images are defined by adjusting one or more data within the updated metadata, wherein the one or more data is identified to correspond with one or more image features of the updated source image.

* * * * *